Oct. 5, 1965 W. C. VAN'T SANT 3,210,056

CONTACTING TRAY WITH VARIABLE PASSAGE

Filed July 19, 1962

INVENTOR:
WILLEM C. VAN'T SANT
BY: Oswald H. Milmore
HIS ATTORNEY

United States Patent Office 3,210,056
Patented Oct. 5, 1965

3,210,056
CONTACTING TRAY WITH VARIABLE PASSAGE
Willem C. van't Sant, The Hague, Netherlands, assignor to Shell Oil Company, New York, N.Y., a corporation of Delaware
Filed July 19, 1962, Ser. No. 211,027
Claims priority, application Netherlands, Mar. 16, 1962, 276,015
9 Claims. (Cl. 261—114)

The invention relates to contacting trays, sometimes called bubble trays, suitable installation in a contacting column for effecting exchange between ascending gas and descending liquid, e.g., for distillation, absorption, or the like, the term "gas" in used herein to include vapor.

More particularly, the invention is concerned with contacting trays having variable gas passages, wherein the gas passages are controlled by valve bodies which are positioned over the passages through the trays and are supported in their lowest positions by the upper tray surface, wherein each valve body has guides projecting downward through the passage and distributed about the periphery of the passage, the lower ends of said guides being provided with abutments for impinging on the bottom of the tray when the valve is lifted.

Trays of this type are known, for instance, from the following patent specifications: British, No. 843,280 of August 4, 1960, Belgian, No. 588,502 of July 1, 1960, and French, No. 1,263,434 of May 2, 1961.

The elements which form the guides may, in known constructions, consist of metal strips welded to the valve body; they may, in other known arrangements, be integral with the valve body. In the latter case the valve body is stamped out of a metal plate together with the said elements, which are then bent downwards. The said elements may be stamped out of the inner part of the valve body, thereby providing openings in the valve body, so that the body cannot fully close the passage; this requires an additional cover if the openings are not desired or are too large. There are, however, also constructions in which the said elements, before being bent downwards, extend radially outwards from the valve body so that no opening is formed therein; it leads to an uneconomic use of metal.

It is usually desired to maintain a minimal passage through each tray opening when the valve is in its lowermost position; the advantage of this is improved tray contacting efficiency at low loads, when the gas flow is insufficient to raise all valves. It is then preferable to have each valve provide a small opening. Further, if the valve body makes contact with the upper tray surface over the whole periphery there is the risk that the valve body may stick. leading to an operational breakdown.

The instant invention provides a contacting tray with passages controlled to a variable opening by valves of an improved design having a number of advantages compared with the previously known constructions.

According to the invention the valve includes a valve body which is positioned above the tray and has guides extending downwardly thereof near the edge of the opening which guides extend horizontally along the under side of the valve body and outwardly beyond the edge of the tray opening to engage the tray when the valve is in its lowermost position and support the valve body in spaced relation above the tray surface to provide a minimal opening. The valve body is preferably made small, e.g. having an area equal to or only slightly greater than the tray opening, preferably not over 1.2 times said opening, or even smaller than the opening, down to about 0.8 thereof.

By using a small valve body, gas from beneath the tray can enter the liquid collected on the tray with a vertical flow component and the valve body can assume a lower position on the tray for a given minimal opening, resulting in a shallower construction.

An important advantage of the small valve body and the flow of gas with a vertical component is that there are reduced pressure drop and increased capacity when the gas enters the liquid at an angle to the tray surface instead of being deflected to the horizontal; it was found that the contacting efficiency is not significantly diminished by this direction of the gas flow.

A second advantage is that the valve bodies are supported by localized contact with the upper tray surface in the position of maximum closure; further, this provides a minimal residual opening, so that the above-mentioned desiderata are both attained in a simple manner. A third advantage resides in the economy with which the valves can be fabricated, it being possible to secure the guides to the valve bodies without special forming or cutting; the invention is not, however, restricted to this feature.

The valve bodies preferably have shapes which, speaking geometrically, are similar to the flow openings through the trays, and, advantageously, congruent; in the latter case they can consist of flat discs punched from the tray when forming the openings therein, thereby attaining a considerable economy in the utilization of metal. In this way no additional costs for metal are involved, since the necessary material is available in the form of waste from punching trays. This economy is possible in part even when the valve bodies are slightly larger than the openings by using the discs punched from other trays.

It should be noted that, in principle, the valve bodies and the corresponding tray openings may have any desired shape, although circular shapes are most common. However, the invention is not restricted to any specific shape.

The guides preferably consist of flat strips or bands of metal or the like, which may be resilient. According to a specific construction according to the invention they are situated partly below and partly above the valve body and secured thereto by clamping parts thereof about the edge of the valve body.

According to another specific construction the valve bodies are supported in their lowest positions by a plurality of stops or lips which project radially outward beyond the edge of the valve body at the under side thereof to rest on the upper tray surface.

According to a feature of the invention, the constructions of either of the preceding paragraphs can be attained by forming a plurality, e.g., two guides integrally as one guide unit formed of a metal band the central part of which is positioned in engagement with the under side of the valve body, said strip having longitudinal incisions at the ends to subdivide each end of the band into parallel sections, one band of each section being bent downward to constitute a guide and the other being either bent upward and over the valve body to clamp the guide unit thereto, or extended radially to provide the said lip. When the latter sections are extended to provide lips the guide unit is secured to the valve body by some other means, e.g., by riveting or spot welding.

The invention will now be further illustrated with reference to the accompanying drawing forming a part of this specification and showing three preferred embodiments of the valve and certain variants of the tray, wherein:

FIGURE 1 is a sectional view through a part of a tray showing a valve, partly in section and partly in elevation;
FIGURE 2 is a plan view of the valve according to FIGURE 1 and a portion of the tray;
FIGURE 3 is a plan view of a band prior to bending to form the guide unit;
FIGURE 4 is a view corresponding to FIGURE 1 showing a second embodiment;

Referring to FIGURES 1–3, 10 represents a part of a contacting tray having a plurality of gas passages 11, only one of which appears. It will be understood that several of such trays are mounted in vertically spaced relation within a contacting column to accumulate bodies of liquid which descend in known manner from tray to tray, e.g., via downcomers or through the said gas passages. Each gas passage has a vertically movable valve which includes a valve body 12, e.g., made of imperforate sheet metal and may be of the same stock as the tray, e.g., punched therefrom. The body 12 preferably has an area not more than 1.2 times the area of the opening 11.

Figure 3:
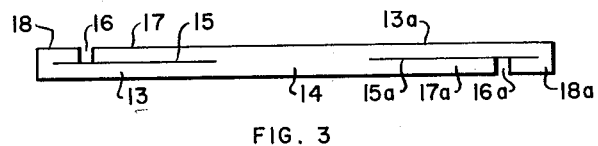

Each valve further has a plurality of guides 13, 13a, which may be integral with a guide unit formed from a band of metal shown in FIGURE 3. This metal may be rigid or resilient. The guide unit includes an intermediate part 14 and has longitudinal incisions 15, 15a, cut into the portions on each end of said intermediate part, and transverse incisions 16, 16a, inward from the ends. This divides one end of the band into a guide section 13 and a parallel, shorter clamping section 17, and the other end into corresponding sections 13a and 17a.

The guide unit is assembled to the valve body by bending the sections 17 and 17a about the edge of the body and over it to clamp the unit to the valve body. The guides 13 and 13a are bent downwards. It will be noted that the incisions 15, 15a extend slightly beyond the incisions 16, 16a to provide tongues 18, 18a. These are bent as appears in FIGURE 1 to form outwardly-extending and upwardly directed abutments to form barb-like stops which engage the under side of the tray 10 when the valve is lifted to its uppermost position. However, the invention is not restricted to specific construction of the abutments at the lower ends of the guides.

As appears in the drawings, an additional one of such guide units may be clamped to one valve body. This includes an intermediate part 14a and a pair of guides, of which only the guide 13b and the clamping sections 17b and 17c appear. The guide units are oriented to distribute the guides uniformly about the periphery of the valve body.

The valve is installed in the tray in a manner dependent on the material of the guides. It is particularly attractive to install them by working from the top only, thereby obviating the need for a workman beneath the tray. This is feasible when the guides are made of resilient material by simply forcing the assembled valve downwards through the passage 11 from the top of the tray. The guides are deflected radially inwardly by a camming action when the tongues 18, 18a, engage the tray until they are fully below the tray, whereupon they move resiliently back to or substantially to the positions shown. The guides, so to speak, "seek" the center of the opening 11 and click back when the tongues are below the tray.

If the guides are not of resilient material the tongues 18, 18a, etc., are bent after insertion through the opening 11.

Figure 1:
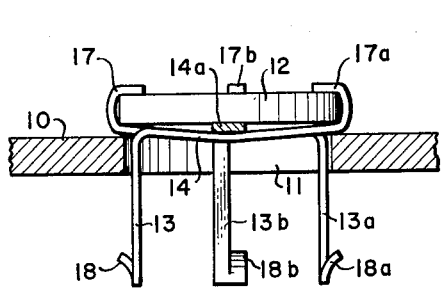
Figure 2:
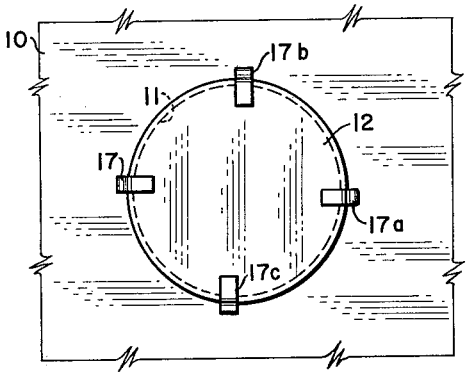

As appears from FIGURE 1, the upper parts of the guide extend laterally beyond the edge of the openings 11 to rest on the upper tray surface and support the valve body at localized areas and insure a minimal opening.

Figure 4:
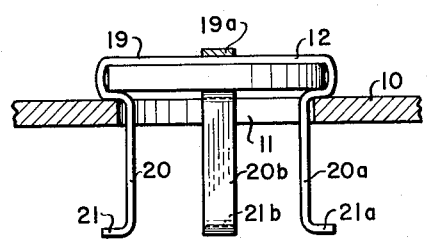

In the arrangement shown in FIGURE 4 the guide units are formed of continuous, flat metal strips without incisions. Each guide unit includes a horizontal, intermediate part 19 or 19a which extends above the valve body 12 and is clamped about the edges and radially inwards to points within the outline of the opening 11; they extend thence downwards to provide guides 20 and 20a, or a pair of guides intermediate thereto of which only the guide 20b appears. The outward-extending and upwardly-directed abutments are, in this embodiment, horizontal tips 21, 21a, 21b, formed by bending the guide ends outwards. This valve—when the guides are resilient—is installed by confining the guides by hand or by a suitable tool to pass through the opening 11, after which the guides are released to move resiliently outward. When the guides are not resilient the tips 21–21b must be bent after the guides are inserted through the tray opening.

In operation the valve of FIGURE 4 operates as described for the first embodiment.

Figure 5:
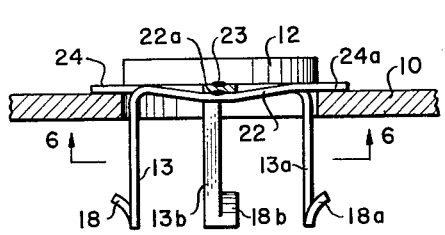
FIGURE 5 is a view corresponding to FIGURE 1 showing a third embodiment.
Figure 6:
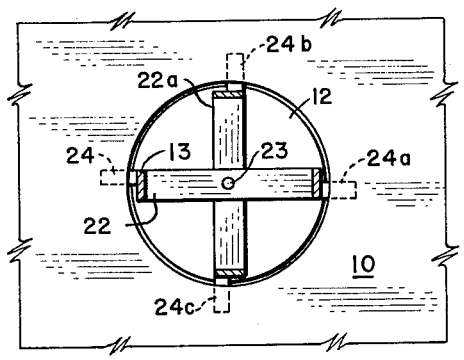
FIGURE 6 is a sectional view looking up, taken on the line 6—6 of FIGURE 5.

In the third embodiment, shown in FIGURES 5 and 6, the guide units are situated entirely on the underside of the valve body 12 which has the shape of the opening 11, but is slightly smaller, as shown. It may thus be punched from the tray 10. They include horizontal, intermediate parts 22, 22a, which extend at right angles and are secured to the center of the valve body, for example, by riveting or by spot welding as appears at 23. Each guide unit is formed with incisions as described for FIGURE 3 and the longer guide sections 13, 13a, etc., are bent down and formed with abutment tongues 18, 18a, etc., as described. However, the shorter sections 24, 24a, 24b, 24c, extend radially outwards beyond the edge of the valve body to constitute lips which rest on the upper tray surface near the margin of the opening.

The valve of the third embodiment is installed to the tray as described above, i.e., by pressing it downward if the guides are of resilient material or by bending the tongues 18, 18a, etc., after insertion if of rigid material. However, they may be installed from top only even though the guides are not resilient, provided they possess some flexibility, by initially shaping the guides with a slight inward inclination so that the tongues 18, 18a, etc., can pass through the opening 11 and then pressing down on the valve body; the resulting upward pressure on the ends of the lips deforms the guide unit in the vicinity of the end of the incision to turn the guides outwardly to their vertical positions and places the tongues 18, 18a, etc., beyond the edge of the opening to render them operative. In this manner of installing the valves there is no camming action and it is, therefore, practicable to use the horizontal tips 21 of FIGURE 4 instead of inclined tongues, the said tips being turned outwards prior to installation.

The advantage of the third embodiment is that there is a freedom of choice as to the lengths of the support lips 24, 24a, etc., so that when the valve bodies are of very small diameters in relation to the diameter of the tray opening there is no risk of the composite valve falling through or becoming jammed within the opening 11 during operation.

Figure 7:
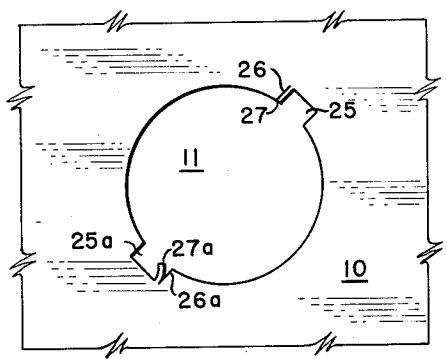
FIGURE 7 is a fragmentary plan view of a portion of the tray showing an optional arrangement for installing the valves.

The valves can be installed in the tray working from the top only even though the guides are neither flexible nor resilient by cutting one or more notches into the tray at the periphery of the tray openings to accommodate the abutments at the lower ends of the guides. A tray 10 so cut is illustrated in FIGURE 7: the opening 11 has one or more notches 25 or 25a, the former being shown in the condition prior to installation of the valve and the other after installation. There is an incision 26 or 26a parallel to the radial dimension of the notch, to leave a tip 27 or 27a adjoining the notch. The notches are large enough to permit the outwardly-turned abutments at the lower guide ends to pass through, and when passage of all guides has been effected the lips are bent laterally (e.g., in the plane of the tray) to the position shown for the lip 27a, thereby securing the abutment against passage through the notch. It will be understood that the radial extents of the lips 24, 24a, etc., should preferably be large enough to prevent entry into the notches. In principle, the provision of one notch is usually sufficient.

The cross-section of the metal strip forming the guide units can, of course, be selected at will. This gives a wide degree of freedom with respect to the thickness of the interval between the upper tray surface and the bottom of the valve member in all three embodiments. It also gives a degree of freedom regarding the lengths of the strips, whereby the weight of the composite valve can be controlled, particularly when the thickness of the valve body is predetermined by the stock used for tray and said body is punched therefrom. The maximum height to which the valve can rise is obviously in the first and third embodiments independent of the lengths of the guides since there is freedom of choice as to the locus where it is desired to make the incisions to form the abutment tongues.

I claim as my invention:

1. A gas-liquid contacting apparatus comprising: a contacting tray adapted to be mounted horizontally within a contacting column to retain a body of liquid thereon and having a flow opening therethrough, and a valve mounted on said tray for vertical movement to control the passage through the said opening, said valve comprising:
    (a) a valve body situated above the tray and
    (b) a plurality of guides separate from and attached to said body and extending downwards therefrom through the flow opening and distributed about the periphery of the opening, each of said guides having outwardly-extending and upwardly-directed abutment means positioned for engagement with the under side of the tray to limit upward movement of the valve,
    (c) said guide having parts thereof extending horizontally outwardly beyond the edge of the opening at the under side of the valve body for engagement with the top surface of the tray, thereby to maintain the valve body spaced above said tray surface when the valve is in the lowermost position thereof.

2. Apparatus as defined in claim 1 wherein the area of said valve body is between 0.8 and 1.2 of the area of said opening.

3. Apparatus as defined in claim 1 wherein the outline of said valve body is congruent to the tray opening and consists of material like that of the tray, whereby said valve bodies can be punched from said tray.

4. Apparatus as defined in claim 3 wherein said valve bodies are flat discs and the outline of the valve body and the outline of the flow opening are circular.

5. Apparatus as defined in claim 1 wherein said guides are metal bands having flat portions the upper ends of which bands continue, beyond said horizontally outwardly extending parts, upwards about the edge of the valve body and over at least a part of the top thereof in clamping engagement therewith.

6. Apparatus as defined in claim 1 wherein said guides are metal bands having flat portions the upper ends of which bands continue, beyond said horizontally outwardly extending parts, as substantially radially protruding lips positioned to engage the upper tray surface.

7. A gas-liquid contacting apparatus comprising: a contacting tray adapted to be mounted horizontally within a contacting column to retain a body of liquid thereon and having a flow opening therethrough, and a valve mounted on said tray for vertical movement to control the passage through the said opening, said valve comprising:
    (a) a valve body situated above the tray, and
    (b) a separate, metal guide unit which is formed of a metal strip having flat portions attached to said valve body and includes
        (1) an upper, substantially horizontal part juxtaposed to said valve body at the lower face thereof,
        (2) said unit having, on each extremity of said horizontal part, a pair of narrower sections formed by longitudinal incisions in the strip, one section of each pair being bent downward to form a guide which extends downwards through said opening to form a guide, and the other section of each pair extending radially outwardly beyond the edge of the opening for engagement with the top surface of the tray, thereby to maintain the valve body spaced above said tray surface when the valve is in the lowermost position thereof, and
        (3) said guides being distributed about the periphery of the opening and each guide having outwardly-extending and upwardly-directed abutment means engageable with the under side of the tray to limit upward movement of the valve.

8. Apparatus as defined in claim 7 wherein the said other section of each pair continues upwards about the edge of the valve body and over at least a part of the top thereof in clamping engagement with the top and bottom of the valve body.

9. Apparatus as defined in claim 7 wherein said other section of each pair is a protruding lip.

References Cited by the Examiner

UNITED STATES PATENTS 3,019,003  1/62  Glitsch _____ 261—114
3,080,155  3/63  Glitsch et al. _____ 261—114

HARRY B. THORNTON, *Primary Examiner.*

RONALD R. WEAVER, *Examiner.*